United States Patent [19]
Scudder et al.

[11] Patent Number: 5,626,022
[45] Date of Patent: May 6, 1997

[54] CONTAINER WITH INTEGRAL MODULE FOR HEATING OR COOLING THE CONTENTS

[75] Inventors: James A. Scudder, San Diego; James L. Berntsen, Ramona, both of Calif.

[73] Assignee: Insta-Heat, Inc., San Diego, Calif.

[21] Appl. No.: 550,457

[22] Filed: Oct. 30, 1995

Related U.S. Application Data

[63] Continuation-in-part of Ser. No. 250,537, May 31, 1994, Pat. No. 5,461,867.

[51] Int. Cl.⁶ .................................................... F25D 5/00
[52] U.S. Cl. .............................. 62/4; 62/371; 126/263.01; 126/263.08
[58] Field of Search .................... 62/4, 371, 293; 126/262, 263.01, 263.05, 263.06, 263.07, 263.08, 263.09

[56] References Cited

U.S. PATENT DOCUMENTS

| | | | |
|---|---|---|---|
| 3,970,068 | 7/1976 | Sato | 62/4 |
| 4,784,678 | 11/1988 | Rudick et al. | 62/4 |
| 5,088,870 | 2/1992 | Fukuhara et al. | 413/4 |
| 5,255,812 | 10/1993 | Hsu | 220/277 |
| 5,461,867 | 10/1995 | Scudder et al. | 62/4 |

FOREIGN PATENT DOCUMENTS

| | | |
|---|---|---|
| 0255494 | 2/1988 | European Pat. Off. |
| 255494 | 3/1988 | European Pat. Off. |
| 2659940 | 9/1991 | France |
| 356576 | 10/1961 | Switzerland |
| 2131542 | 6/1984 | United Kingdom |
| 93/17928 | 9/1993 | WIPO |
| 9317928 | 9/1993 | WIPO |

*Primary Examiner*—William Doerrler
*Attorney, Agent, or Firm*—Brown, Martin, Haller & McClain

[57] ABSTRACT

An container for holding a material, such as a food, beverage or medicine, includes a cap and a container body. The container body has a material cavity unitarily formed with a reactant cavity. The reactant cavity contains a solid reactant, and the cap contains a liquid reactant that, when mixed, produce an endothermic or exothermic reaction, depending upon the reactants selected. The cap has a tubular body section with an actuator disc closing one end and a breakable barrier closing the other end. With the exception of the barrier, the cap is of unitary construction. The cap has one or more prongs extending from the inner surface of the disc toward the barrier. When a user depresses the actuator disc, it flexes inwardly and moves the prongs toward the barrier. The reactants mix when the prongs puncture the barrier. Heat transferred between the two cavities heats or cools the material. The wall of the container that defines the reactant cavity may be pleated or corrugated to promote heat transfer.

25 Claims, 5 Drawing Sheets

CONTAINER WITH INTEGRAL MODULE FOR HEATING OR COOLING THE CONTENTS

CROSS-REFERENCE TO RELATED APPLICATION

This is a Continuation-in-Part of application Ser. No. 08/250,537, filed May 31, 1994, now U.S. Pat. No. 5,461,867.

BACKGROUND OF THE INVENTION

The present invention relates generally to containers for heating or cooling materials such as food, beverages, medicines, and the like and, more specifically, to a container that includes an internal module that adds heat to or removes heat from the materials in the surrounding container.

Containers may have integral modules for warming materials in the container, such as Japanese sake, coffee, or soup. Examples of such self-heating containers are disclosed in U.S. Pat. No. 4,640,264, issued to Yamaguchi et al., and U.S. Pat. No. 4,784,113, issued to Nagai et al. Such containers typically include an outer can, in which the food or beverage is sealed, and a sealed module or inner can that contains two chemical reactants. The reactants are stable when separated from one another but, when mixed, produce an exothermic reaction. It is known that combinations of other reactants will produce endothermic reactions to cool the container contents.

The inner can is typically disposed adjacent one end of the outer can. The inner can has two chambers, each of which contains one of the chemical reactants, separated by a breakable barrier such as metal foil or a thin plastic film. Typically, one of the reactants is in solution, and the other is in a solid powdered or granular form. A rod extends into the outer can at the end adjacent the inner can. One end of the rod is adjacent to the barrier, and the other end terminates in a button outside the outer can. To initiate the reaction that warms or cools the contents of the outer can, the can is disposed with that end upright. Depressing the button forces the rod downward, breaking the barrier and allowing the liquid reactant to drop into the solid reactant. The end of the rod may have a flared head to facilitate complete puncturing of the barrier. The heat produced by the resulting exothermic reaction or used by the resulting endothermic reaction is transferred between the inner can and the contents of the outer can by conduction. Exothermic reactions also typically generate a gas, which is allowed to escape through vents in the end of the container. When the reaction has stopped, the container is inverted. The second end of the outer can has a seal, such as pull-tab, that may be opened and through which the user may consume the heated contents.

Self-heating and self-cooling containers known in the art are uneconomical to manufacture because the mechanism for puncturing the foil barrier commonly has multiple components. The inner can contains the solid reactant and has a short, tubular cap sealing one end. The cap contains the liquid reactant. One end of the cap is sealed with the foil barrier, and the rod extends through an opening in the other end of the cap. Depressing the button forces the rod to slide in the opening until it punctures the foil barrier. Practitioners in the art have found that forcing a rod through the foil opens a large passage through which the liquid reactant can flow, thereby minimizing the time required for the liquid to drain from the cap into the remainder of the inner can. However, fabricating and assembling the multiple components increases the cost of the container. Furthermore, liquid can leak between the rod and the opening in the cap through which the rod moves. Practitioners in the art have therefore disposed a ring of wax around the rod where it exits the inner can to improve sealing. The step of adding the wax, however, increases the manufacturing complexity and, ultimately, cost of the container. Self-heating and self-cooling containers known in the art may also leak the powdery material that is the product of the completed reaction through the vents when the container is inverted.

The inner can may be unitarily formed with the outer can, as illustrated, for example, in U.S. Pat. No. 3,970,068, issued to Sato, and U.S. Pat. No. 5,088,870, issued to Fukuhara et al. The unitary container body is formed by providing a metal cylinder that is open at one end and closed at the other, and punching or deep-drawing a cavity in the closed end. A cap containing the liquid reactant is attached to the open end of the cavity.

It would be desirable to provide a self-heating or self-cooling container that has a minimal number of separate parts and can be economically manufactured. It would also be desirable to provide such a container with improved vent sealing to prevent leakage of powdery reaction products. These problems and deficiencies are clearly felt in the art and are solved by the present invention in the manner described below.

SUMMARY OF THE INVENTION

In one aspect, the present invention comprises a container body, a sealed cap at one end of the body, and a closure at the other end of the body. The body may have any suitable generally tubular shape, such as cylindrical or bottle-shaped. The body has two unitarily formed cavities: a material cavity and a reactant cavity. The food, beverage, medicine or other material to be heated or cooled is contained in the material cavity. A first reactant is contained in the reactant cavity, and a second reactant is contained in the cap, which is disposed in the opening of the material cavity. Although these reactants may be included in any compounds or mixtures known in the art, the first reactant is preferably a solid and the second reactant is preferably a liquid that produce an exothermic or endothermic reaction upon mixing. Mixing of the reactants, which may comprise any suitable chemical compounds or mixtures, produces an exothermic or endothermic chemical reaction, depending upon the reactants selected. The contents of the material cavity surround a portion of the wall of the reactant cavity, thereby facilitating conduction of heat.

The cap includes a flexible member at one end and a breakable barrier closing the other end. The cap has one or more prongs extending toward the barrier from one or more points on the inner surface of the flexible member. With the exception of the barrier, the cap is of unitary construction. A user may depress the outer surface of the flexible member with a finger to actuate the container. Prior to actuation, the flexible member is in a retracted position. In response to the force applied to the flexible member by the user, the prong or prongs move in an axial direction, i.e., toward the barrier, thereby puncturing it and allowing the first and second materials to mix. After removing finger pressure from the flexible member, it may snap or lock into the depressed or extended position with the prongs extended or it may resiliently resume the retracted position.

The flexible member may have any suitable shape that allows multiple points on its inner surface to move in an at least partially axial direction in response to a force having at least a component in that direction. For example, the inner surface of the flexible member may have a concave or dished shape (when viewed from the interior of the cap body) prior to actuation of the container and extend to a convex shape upon actuation. Alternatively, it may have a generally flat shape prior to actuation of the container and extend to a convex or bulbous shape (when viewed from the interior of the cap body) upon actuation. The shape of the inner surface of the flexible member may be described in terms of the locations of multiple points on it. In the former example, prior to actuation, different points on the inner surface of the flexible member are at different axial distances. If the inner surface of such a flexible member has a shape that is symmetric about a central axis, such as a hemisphere or other symmetric dome, points at different radial distances from the axis are at different axial distances, and points at any given radial distance are at the same axial distance. In the latter example, prior to actuation, all points on the inner surface of the flexible member are at the same axial distance. Still other shapes, such as an accordian-like, button-shape, may also be suitable. In response to the actuation force, the entire flexible member may flex or only portions of it may flex. The actuation force, however, may be applied to any movable or deflectable portion, flexible or non-flexible. The flexible member may be made of a semi-rigid material such as plastic or an elastomeric material such as rubber.

The cap may have one or more vent channels disposed around its periphery that allow gaseous products of a reaction to escape but inhibit leakage of solids.

After the reaction in a self-heating or self-cooling container is started, the user may invert the container. The gaseous reaction products escape through the vent channels. After the reaction is completed, the user may remove a closure, such as a pull tab, to access the contents for consumption. Despite the then-inverted orientation of the container, the channels minimize leakage of solid reaction products. (The liquid reactant does not leak because it is used up in the reaction or absorbed by the solids.)

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF A PREFERRED EMBODIMENT

Figure 6:
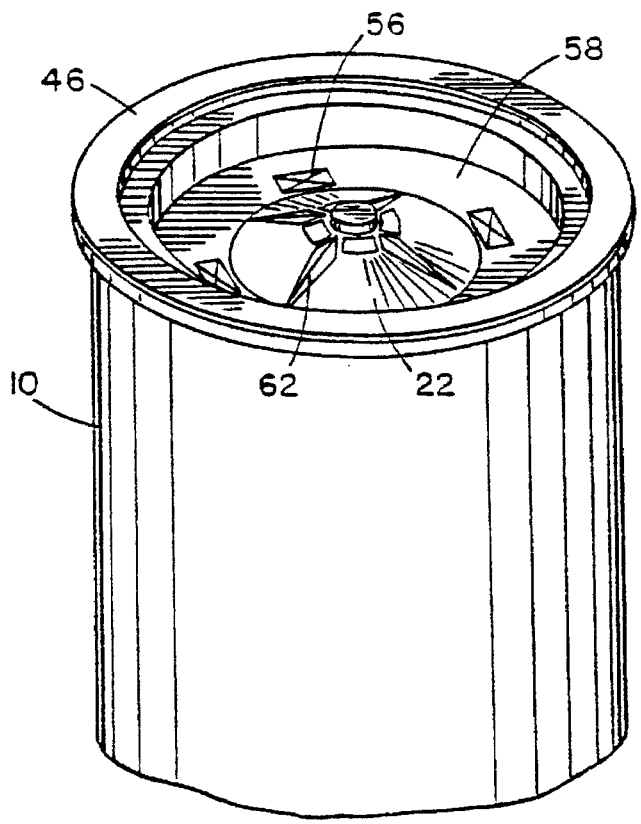
FIG. 6 is a partial perspective view of the container of FIGS. 1–5.

As illustrated in FIGS. 1–4, a container comprises a cylindrical container body 10, which may contain a beverage 12, and a thermic module 14 for heating beverage 12. Thermic module 14 seals one end of container body 10, and an endcap 15 with a pull-tab closure 16 of the type commonly used to seal beverage cans seals the other end. An exterior view of the end of the container at which thermic module 14 is disposed is shown in FIG. 6. When the container is actuated, as described below, thermic module 14 generates heat, which is transferred by conduction to beverage 12. The container may then be inverted and pull-tab closure 16 opened to allow beverage 12 to be consumed.

Thermic module 14 comprises a cylindrical module body 18 and a cylindrical module cap 20. Module cap 20 is of unitary construction and is made of a semi-rigid plastic, such as high density polyethylene. Module cap 20 has an actuator disc 22 and four prongs 24. A breakable barrier 34 made of metal foil is adhesively attached to module cap 20. Barrier 34 seals water 36 inside module cap 20. Module body 18 contains a solid chemical 38 such as calcium oxide, commonly known as quicklime. An annular cap channel 40 receives the lip 42 of module body 18, thereby sealing solid chemical 38 inside. Cap channel 40 may have crushable dimples 44 that improve sealing. Module body 18 is preferably made of a metal, such as aluminum.

As mentioned above, the container is sealed at both ends. Sealing ring 46 secures thermic module 14 in container body 10. Sealing ring 46 has a ring channel 48 that receives the hook-like lip 50 of container body 10. Sealing ring 46 is crimped over lip 50 to form a tight seal. At the opposite end of the container, endcap 15 has a similar endcap channel 51 that receives the opposite lip 53 of container body 10. Endcap 15 is crimped over the opposite lip 53 of container body 10 in a similar manner. A sealing compound (not shown) of the type commonly used in the can industry may be disposed in ring channel 48 to further improve sealing. Thermic module 14 is press-fit in the opening of sealing ring 46. The portion of thermic module 14 that contacts sealing ring 46 may have crushable dimples 52 to further improve sealing.

To actuate the container, a safety seal 54, which is adhesively attached to thermic module 14, must be removed or broken. Safety seal 54 minimizes the possibility of tampering or inadvertent actuation of the container. Although safety seal 54 may be plastic, foil, paper or other suitable films, it is preferably transparent to allow viewing of actuator disc 22. The container may also have an outer lid 55 made of plastic that snaps over the end of container body 10. Outer lid 55 not only further reduces the likelihood of inadvertent actuation, but can also be used to retain condiments such as a packet of sugar (not shown) or a promotional item such as a coupon (not shown) between it and safety seal 54. Lid 55 may be transparent.

Figure 5:
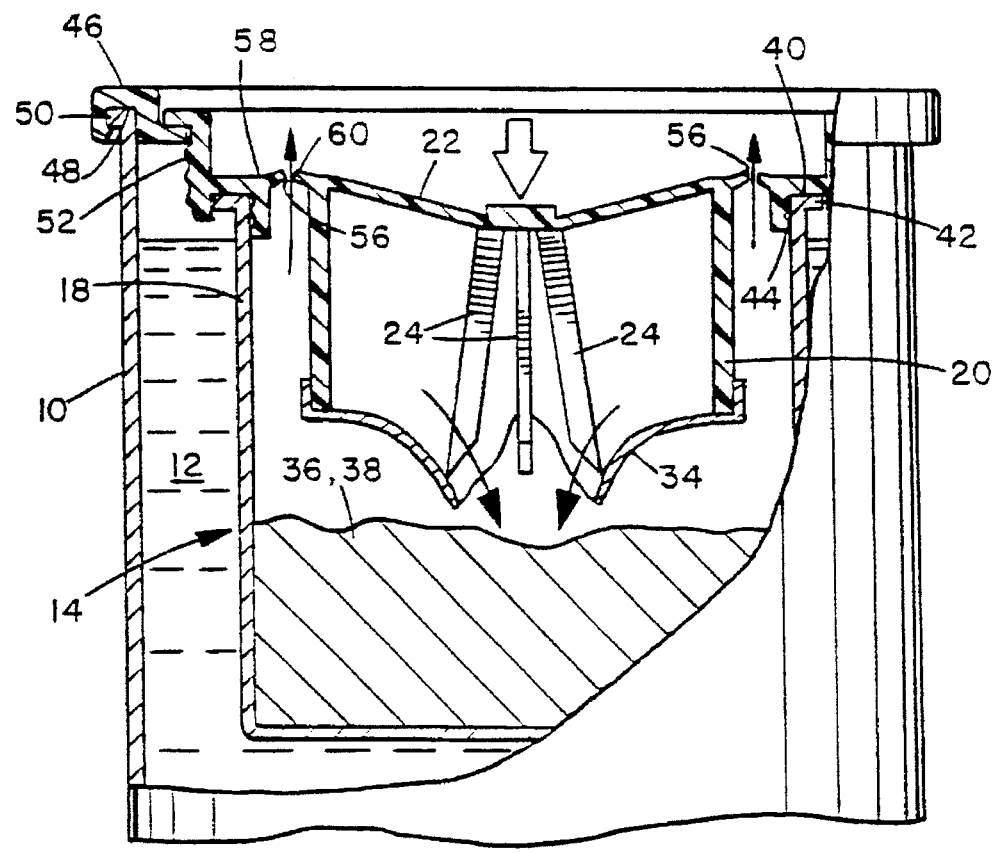
FIG. 5 is an enlarged view similar to FIG. 1, showing actuation of the container.

As illustrated in FIG. 5, when an axially directed force is applied at or near the center of actuator disc 22, it flexes toward barrier 34. The distal ends of prongs 24 both move axially and spread apart radially to facilitate complete puncturing of barrier 34. Water 36 flows through the punctured barrier 34 and mixes with solid chemical 38. The resulting exothermic reaction produces heat, which is transferred to beverage 12 by conduction through module body 18, and carbon dioxide, which escapes through four vents 56 that are distributed around an annular lip 58 between module body 18 and module cap 20.

Figure 3:
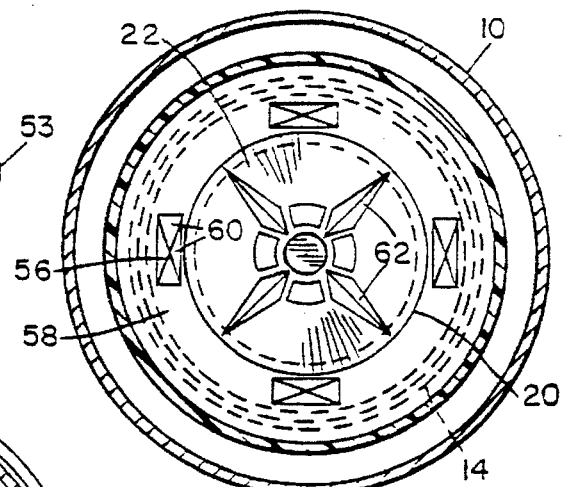
FIG. 3 is a sectional view taken along line 3—3 of FIG. 1.
Figure 4:
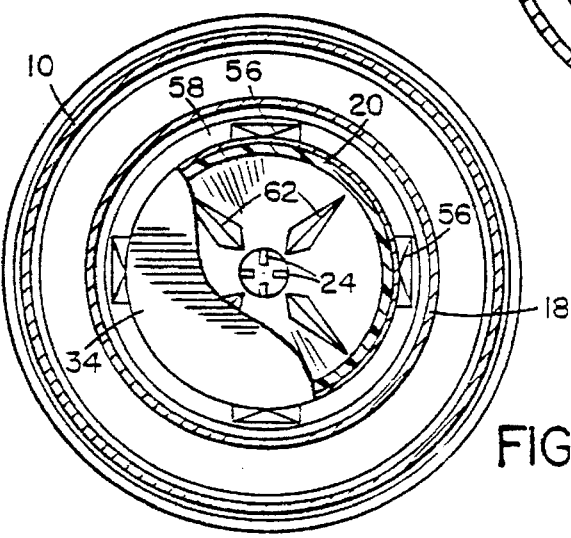
FIG. 4 is a sectional view taken along line 4—4 of FIG. 1.
Figure 7:
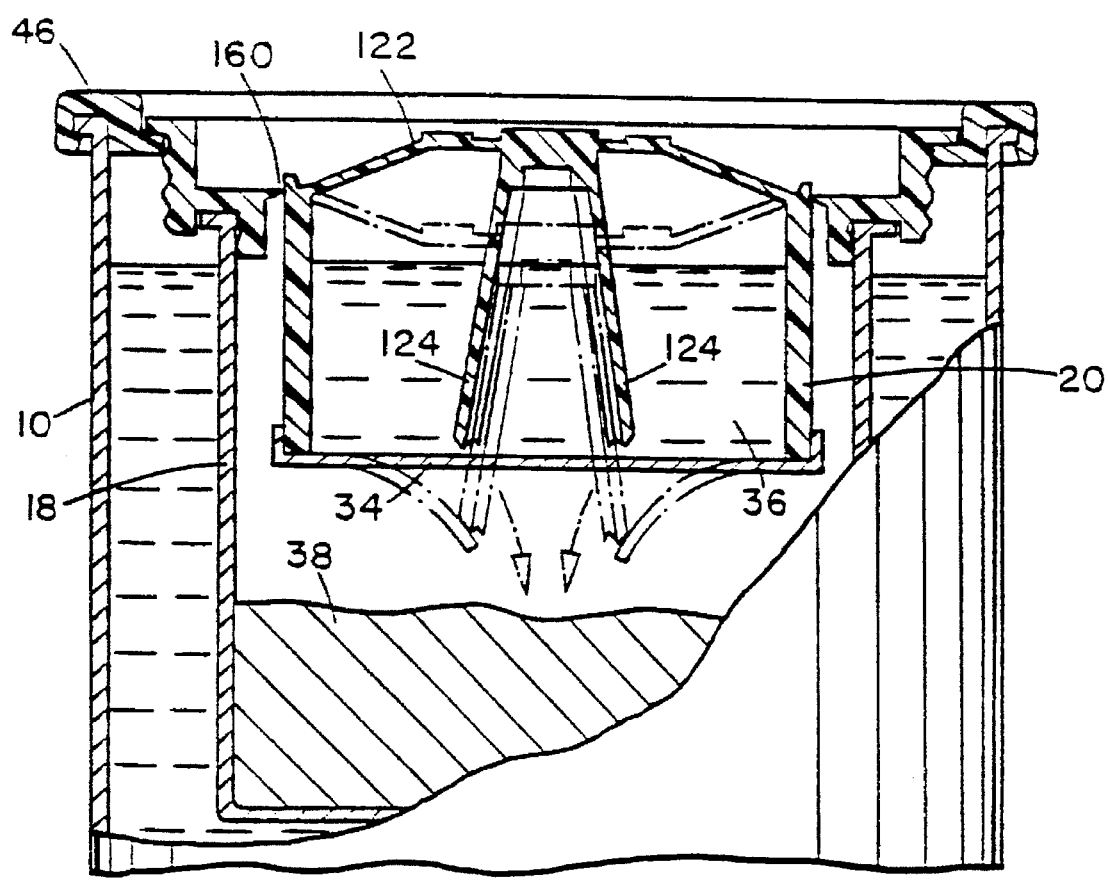
FIG. 7 is an enlarged view similar to FIG. 5, showing an alternative construction of the module cap.
Figure 8:
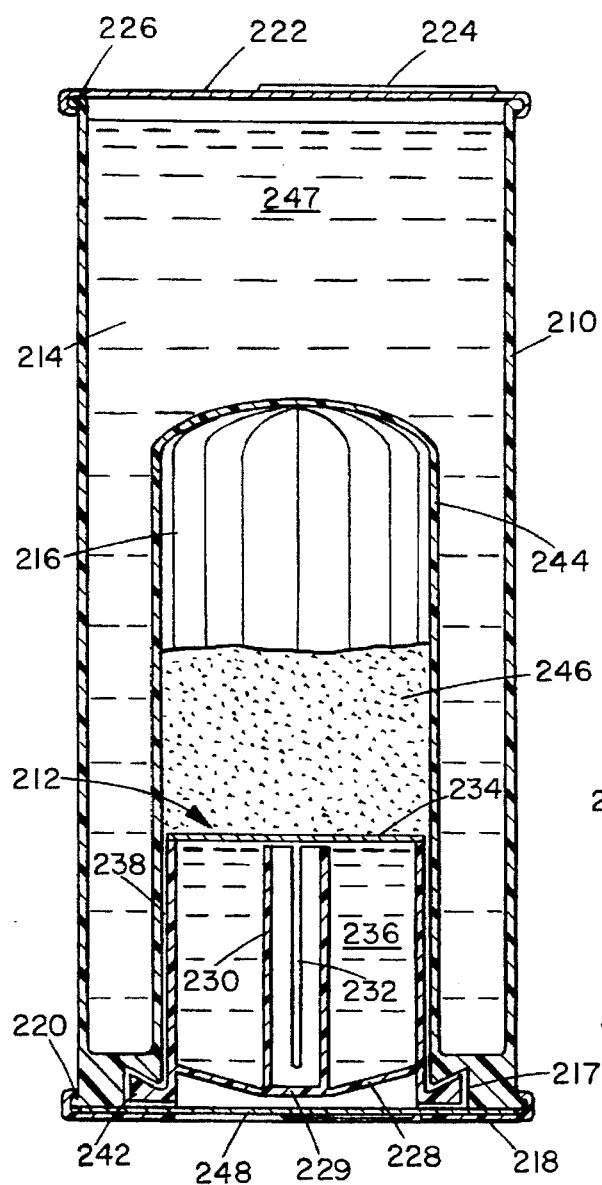
FIG. 8 is a view similar to FIG. 1, showing an alternative container.
Figure 9:
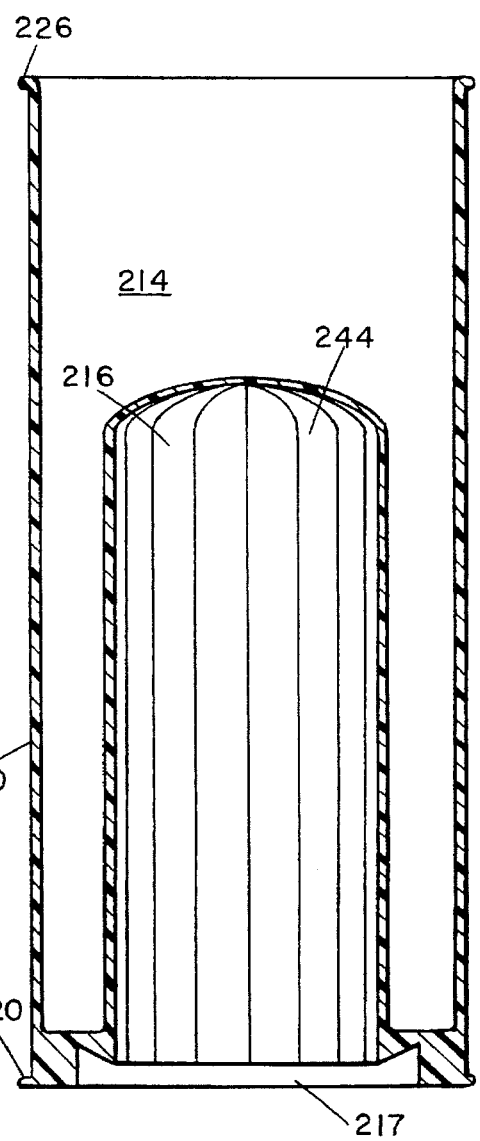
FIG. 9 is a sectional view of the container body by itself.
Figure 10:
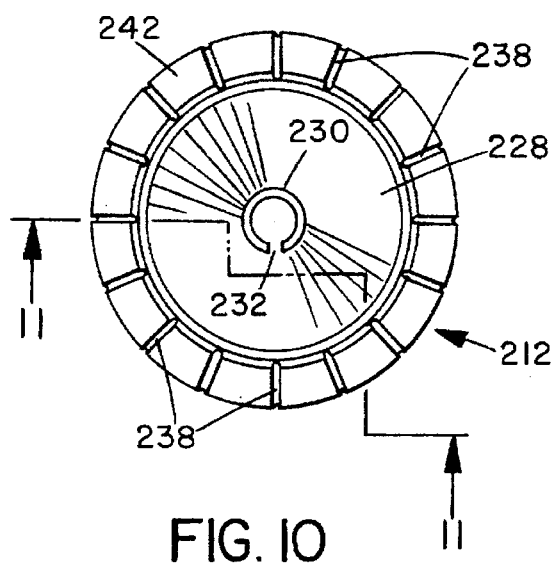
FIG. 10 is a top plan view of the cap.
Figure 11:
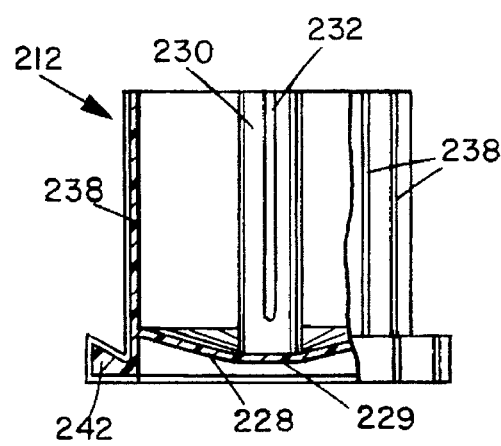
FIG. 11 is a sectional view taken on line 11—11 of FIG. 10.

As best illustrated in FIGS. 3 and 4, vents 56 may comprise four flexible triangular flaps 60, which are in contact with one another when the pressures inside and outside module 14 are equal, but which spread apart to release the gas produced by the reaction. Alternatively, as illustrated in the embodiment shown in FIG. 7, a vent may be formed by a single flap 160.

Figure 1:
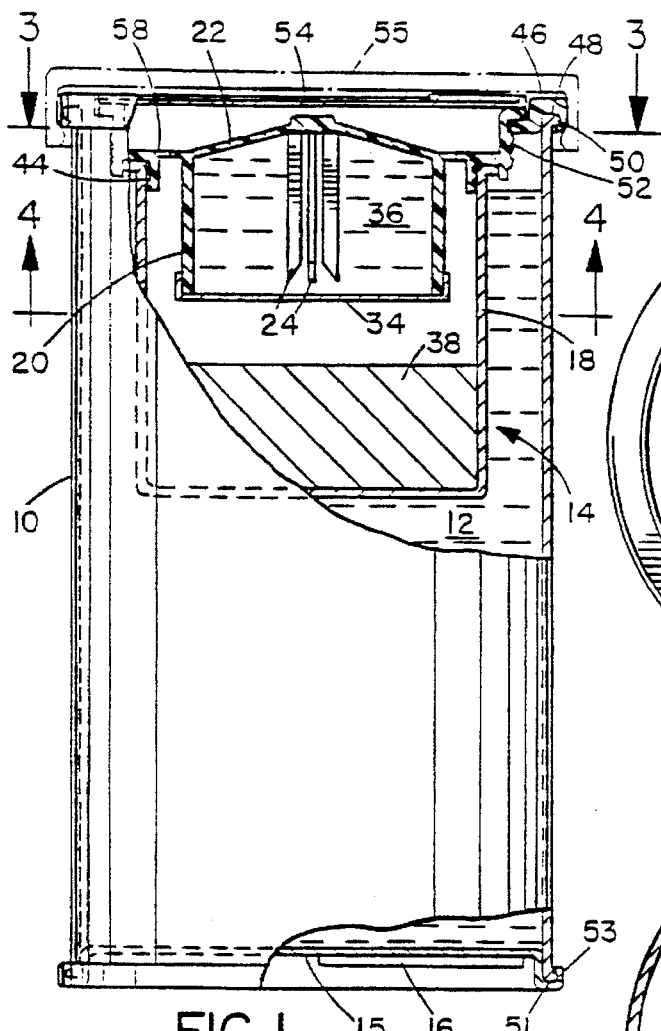
FIG. 1 is a side elevational view of the container, partially cut-away.
Figure 2:
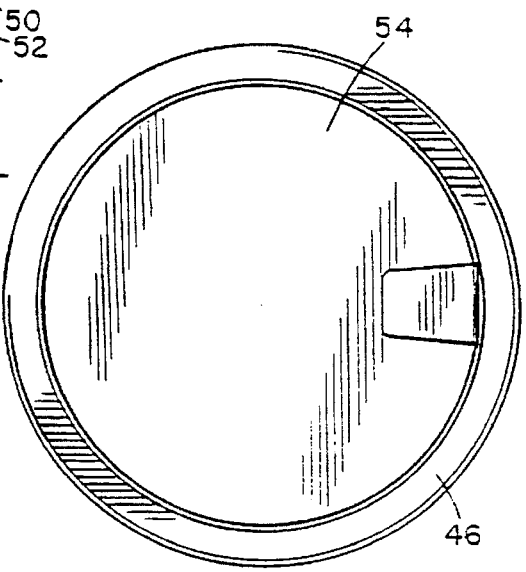
FIG. 2 is a plan view of the container.

In the retracted position of actuator disc 22, i.e., before the container is actuated, actuator disc 22 may appear convex or dome-shaped when viewed from the outside of the container, as shown in FIGS. 1 and 6. In its extended position, i.e., after the container has been actuated, actuator disc 22 may appear concave or dished, as shown in FIG. 5. Actuator disc 22 is preferably stable in both the extended and retracted positions, and "snaps" into the extended position when the container is actuated. The snapping action provides a positive visual and tactile indication to the user that the container has been actuated. At least a portion of actuator disc 22 must flex during the transition between the retracted and extended positions. In the illustrative embodiments, four radial folds 62 facilitate this transition by reducing the amount of force required to flex actuator disc 22. However, in other embodiments, actuator disc 22 may have more, fewer, or no radial folds 62.

Prongs 24 are distributed around the center of actuator disc 22 at the same radial distance. Prongs 24 may be formed by cutting lengthwise a tubular cylinder that is integrally molded in module cap 20. The resulting prongs 24 have sector-shaped cross-sections. Although in the illustrated embodiments, module cap 20 has prongs 24 distributed about the center of actuator disc 22, in other embodiments module cap 20 may have only a single central prong.

Furthermore, the portions of actuator disc 22 that flex when the container is actuated may be at any radial distance from the central axis and may have any suitable shape. They may be concentrated at one or more substantially discrete radial distances or may be continuous over all radial distances. In the embodiment illustrated in FIGS. 1–6, portions of actuator disc 22 that are between prongs 24 are flexible, thereby causing prongs 24 to spread apart radially when the container is actuated. In the alternative embodiment illustrated in FIG. 7, however, the portions of the alternative actuator disc 122 that flex are at greater radial distances than the prongs 124. The flat central portion of actuator disc 122 where prongs 124 are disposed does not flex. Therefore, prongs 124 do not spread apart radially when the container is actuated. Although prongs 124 preferably have a slight radial cant with respect to the central axis of the container, prongs 124 remain in that orientation regardless of whether actuator disc 122 is in the extended or retracted position. Such an embodiment facilitates injection molding because the areas of flexure are not adjacent to prongs 124.

Container body 10 may be made of any suitable material, such as cardboard, metal or plastic. A cardboard body 10 resists heat conduction and will thus not be uncomfortable for a user to hold after actuating the container. However, it is known in the art that solid chemical 38 and water 36 can be replaced with suitable combinations of chemicals for producing an endothermic reaction, which would cool beverage 12. In embodiments that cool a carbonated beverage, container body 10 should be made of metal or plastic because such materials would facilitate the formation of gas-tight seals.

As illustrated in FIGS. 8–12, an alternative embodiment of the container comprises a container body 210 and a cap 212. Rather than assembling a thermic module in container body 210, as in the embodiment described above, in the present embodiment a portion of container body 210 and a portion of cap 212 in combination perform the heating or cooling function. The resulting container can be manufactured more economically because fewer separate parts, seals and assembly steps are necessary, and because plastic is used extensively in the construction.

Container body 210 is preferably made of injection-molded food-grade plastic and includes a material cavity 214 unitarily formed with a reactant cavity 216. Nevertheless, in other embodiments, two or more plastic pieces may be sonically welded, adhesively joined, or joined by other suitable, sanitary methods to form a container body. Cap 212 is fit in the open end 217 of reactant cavity 216 and is preferably retained by a ring 218 that is crimped over the lip 220 at one end of container body 210. Nevertheless, as noted below, cap 212 may alternatively be sonically welded or adhesively joined to container body 210 because both elements are made of plastic. An endcap 222 with a pull-tab closure 224 of the type commonly used in beverage cans is crimped over the lip 220 at the other end of container body 210.

Cap 212 is of unitary construction and is made of a semi-rigid plastic, such as high density polyethylene. Cap 212 has an actuator disc 228 and a cylindrical prong 230 with an elongated notch 232. A breakable barrier 234 made of metal foil is adhesively attached to the open end of cap 212 to seal water 236 inside.

Cap 212 has multiple vent channels 238 distributed around its outside surface. When cap 212 is fit in the open end of reactant cavity 216, each of vent channels 238 preferably provides a cross-sectional area through which gas can escape of no more than between about 0.0002 and 0.001 square inches. Because vent channels 238 are not shown to scale in FIGS. 10 and 11 for purposes of clarity, it should be noted that this cross-sectional area is quite small, comparable to the inside diameter of a capillary tube. Because this cross-sectional area is thus relatively small in comparison to the predominant granule size of the solid reactant and reaction product tends to aggregate into, a large amount of these solids is unlikely to enter vent channels 238. Nevertheless, some portion of these solids may disintegrate into finer particles and even fine powder. It is in part for this reason that cap 212 has at least about eight vent channels 238. The relatively small cross-sectional area of each vent channel 238 minimizes the probability that the larger solid particles will enter, while the relatively large number of channels 238 minimizes the probability that any significant number of channels 238 will become plugged with the finer, powdery particles. If any vent channels 238 become plugged, gas will be released through the remaining vent channels 238. Vent channels 238 extend longitudinally along the outside surface of the cap body 240, change direction to extend radially along the lower surface of the flange 242 of cap 212, change direction again to extend longitudinally along the outside cylindrical surface of flange 242, and change direction again to extend radially along the upper surface of flange 242. It should be noted that the lower surface of flange 242 is not oriented perpendicularly with respect to the outside surface of cap body 240, but rather at an acute angle of about 45–55 degrees, resulting in a portion of vent channel 238 that is zig-zag or "Z"-shaped. This zig-zag shape of channels 238 functions as a baffle to inhibit the escape of very fine or powdery solid particles that may be small enough to enter channels 238 but too large to become lodged in them and plug them.

Although in the illustrated embodiment ring 218 retains cap 212 in container body 210, because cap 212 and container body 210 are both made of plastic, they may alternatively be sonically welded or adhesively joined. It should be noted that the plastic construction of cap 212 and container body 210 is an important feature of the invention; metal, cardboard and other materials conventionally used in self-heating and self-cooling containers would not be as suitable as plastic. Plastic facilitates construction of a sanitary container, without the need for special seals or coatings of the type used in conventional metal containers. Sonically welding or adhesively joining plastic elements creates joints that are gas-tight and sanitary. Maintaining a gas-tight seal is important in containers that are used to cool carbonated beverages. Moreover, the complex, dual-cavity shape of container body 210 defined by material cavity 214 and reactant cavity 216 is more economical to form in plastic than in metal.

The inner portion of container body 210 defining reactant cavity 216 has a corrugated or pleated wall 244 to increase surface area and, as a result, heat transfer. Cap 212 seals a solid reactant 246, such as calcium oxide, inside reactant cavity 216.

Material cavity 214 may be used to contain a beverage 247, food, medicine, or other material. As described above with respect to other embodiments, beverage 247 is heated or cooled (depending on the reactants used) when the user actuates the container. As noted above, although this embodiment may be used to either heat or cool the material, it is particularly advantageous for cooling due to its plastic construction. It is also particularly advantageous for cooling carbonated beverages because the carbon dioxide dissolved in beverage 247 cannot escape from open end 217 of container 210.

Figure 12:
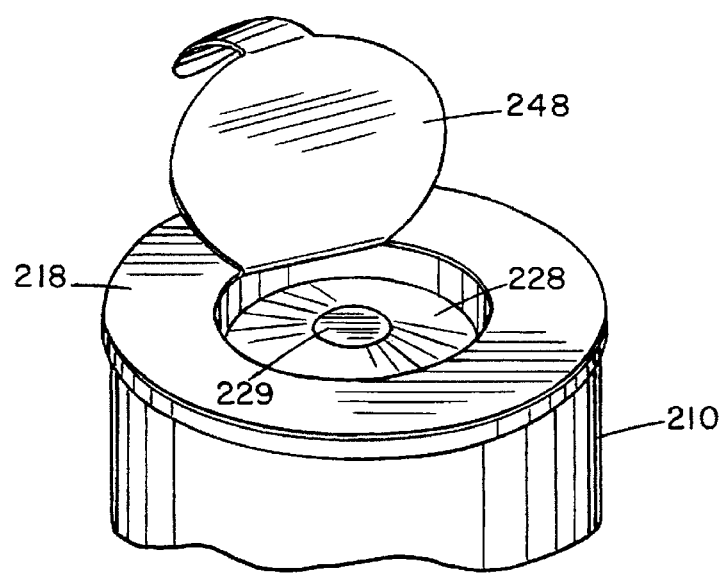
FIG. 12 is a perspective view of the lower end of the container, with the seal opened to expose the actuator disc.

To actuate the container, the user must peel off a safety seal 248, as illustrated in FIG. 12. Safety seal 248 preferably comprises a peelable metal foil with a tab that a user can grip. The periphery of safety seal 248 is crimped under ring 218. A score line separates the central portion of safety seal 248 and allows a user to separate it from the peripheral area. As illustrated in FIG. 12, when a longitudinally or axially directed force is applied at or near the center 229 of actuator disc 228 it flexes toward barrier 234. The distal end of prong 230 punctures barrier 234. Water 236 flows through the punctured barrier 234 and mixes with solid reactant 246. Notch 232 in prong 230 facilitates the flow of water 236 into reactant cavity 216, because water 236 can flow into the hollow interior of prong 230 on one side of barrier 234 and out of prong 230 on the other side of barrier 234. The resulting exothermic reaction produces heat, which is transferred to beverage 247 by conduction through pleated wall 244. Gas produced in the reaction escapes through vent channels 238.

When the reaction is complete, the container may be inverted and pull-tab closure 224 opened to allow beverage 247 to be consumed. In self-heating containers known in the art, when the container is inverted the solid reaction product that remains in reactant cavity 216 tends to escape through the slot-like vents that are used in such conventional containers. While the solid reaction product is not harmful, the sight of it escaping from the container is discomforting to a user and detracts from the marketability of such containers.

In the present invention, however, inverting the container does not allow solid reaction product to escape because, even if a small amount enters vent channels 238, the zig-zag shape of vent channels 238 impedes its progress.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

We claim:

1. A container for selectably changing the temperature of a stored material by mixing two reactants, comprising:

a generally tubular unitarily formed container body having a material cavity for containing said stored material and a reactant cavity for containing a first reactant, said reactant cavity having an opening at a first end of said container;

a cap disposed in said opening at said first end of said container, said cap having a cap body, a flexible member unitarily formed with said cap body, and an elongated member integrally formed with said cap body, said flexible member having an inner surface and an outer surface, at least one point on said inner surface moving in at least a partially axial direction with respect to said container body between a retracted position and an extended position in response to an axial force experienced on said outer surface of said flexible member, said elongated member comprising a hollow prong having a longitudinal notch and having a proximal end disposed at said point and a distal end projecting from said point;

a breakable barrier attached to an open end of said cap for retaining a second reactant in said cap, said distal end of said elongated member extending beyond said open end of said cap when said point on said inner surface is in said extended position; and a removable closure at a second end of said container body for providing access to said stored material in said material cavity.

2. The container recited in claim 1, wherein said reactant cavity is at least partially defined by a pleated wall.

3. The container recited in claim 1, wherein said flexible member is a disc having a concave inner surface and a convex outer surface when said point on said inner surface is in said retracted position.

4. A container for selectably changing the temperature of a stored material by mixing two reactants, comprising:

a generally tubular container body having a material cavity for containing said stored material and a reactant cavity for containing a first reactant, said reactant cavity having an opening at a first end of said container;

a cap disposed in said opening at said first end of said container, said cap having a cap body, a flexible member, and an elongated member, said cap body having a plurality of vent channels extending longitudinally along an outside surface of said cap body adjacent a wall of said container body defining said reactant cavity, said flexible member having an inner surface and an outer surface, at least one point on said inner surface moving in at least a partially axial direction with respect to said container body between a retracted position and an extended position in response to an axial force experienced on said outer surface of said flexible member, said elongated member having a proximal end disposed at said point and a distal end projecting from said point;

a breakable barrier attached to an open end of said cap for retaining a second reactant in said cap, said distal end of said elongated member extending beyond said open end of said cap when said point on said inner surface is in said extended position; and a removable closure at a second end of said container body for providing access to said stored material in said material cavity.

5. The container recited in claim 4, wherein said cap has at least eight vent channels.

6. The container recited in claim 4, wherein each vent channel provides a cross-sectional area between about 0.0002 and 0.001 square inches.

7. The container recited in claim 4, wherein said cap has a flange, and said vent channels extend longitudinally along said outside surface of said cap body to said flange and continue extending radially along a first surface of said flange.

8. The container recited in claim 7, wherein said first surface of said flange is oriented at an acute angle with respect to said outside surface of said cap body.

9. The container recited in claim 7, wherein said flange has a cylindrical wall between said first surface of said flange and a second surface of said flange, and said vent channels continue extending from said first surface of said flange longitudinally along said cylindrical wall.

10. A container for selectably changing the temperature of a stored material by mixing two reactants, comprising:

a generally tubular unitarily formed container body having a material cavity for containing said stored material and a reactant cavity for containing a first reactant, said reactant cavity having an opening at a first end of said container, said reactant cavity at least partially defined by a pleated wall; and a cap disposed in said opening at said first end of said container, said cap having a cap body, a flexible member integrally formed with said cap body, and an elongated member integrally formed with said cap body, said flexible member having an inner surface and an outer surface, at least one point on said inner surface moving in at least a partially axial direction with respect to said container body between a retracted position and an extended position in response to an axial force experienced on said outer surface of said flexible member, said elongated member having a proximal end disposed at said point and a distal end projecting from said point;

a breakable barrier attached to an open end of said cap for retaining a second reactant in said cap, said distal end of said elongated member extending beyond said open end of said cap when said point on said inner surface is in said extended position; and a removable closure at a second end of said container body for providing access to said stored material in said material cavity.

11. The container recited in claim 10, wherein said elongated member is a hollow and generally cylindrical prong.

12. The container recited in claim 11, wherein said prong has an elongated notch extending longitudinally from its distal end.

13. The container recited in claim 10, wherein said flexible member is a disc having a concave inner surface and a convex outer surface when said point on said inner surface is in said retracted position.

14. The container recited in claim 10, wherein said cap has a plurality of vent channels extending longitudinally along an outside surface of a said cap body adjacent a wall of said container body defining said reactant cavity.

15. The container recited in claim 14, wherein said cap has at least 15 vent channels.

16. The container recited in claim 14, wherein each vent channel provides a cross-sectional area between about 0.0002 and 0.001 square inches.

17. The container recited in claim 14, wherein said cap has a flange, and said vent channels extend longitudinally along said outside surface of said cap body to said flange and continue extending radially along a first surface of said flange.

18. The container recited in claim 17, wherein said first surface of said flange is oriented at an acute angle with respect to said outside surface of said cap body.

19. The container recited in claim 17, wherein said flange has a cylindrical wall between said first surface of said flange and a second surface of said flange, and said vent channels continue extending from said first surface of said flange longitudinally along said cylindrical wall.

20. A container for selectably mixing two reactants, comprising:

a container having a container opening, said container for holding a first reactant;

a cap disposed in said container opening, said cap having a cap body, a flexible member integrally formed with said cap body, and an elongated member integrally formed with said cap body, said cap body having a plurality of vent channels extending longitudinally along an outside surface of said cap body adjacent a wall of said container, said flexible member having an inner surface and an outer surface, at least one point on said inner surface moving in at least a partially axial direction with respect to said container body between a retracted position and an extended position in response to an axial force experienced on said outer surface of said flexible member, said elongated member having a proximal end disposed at said point and a distal end projecting from said point; and a breakable barrier attached to an open end of said cap for retaining a second reactant in said cap, said distal end of said elongated member extending beyond said open end of said cap when said point on said inner surface is in said extended position.

21. The container recited in claim 20, wherein cap has at least about 15 vent channels.

22. The container recited in claim 20, wherein each vent channel provides a cross-sectional area between about 0.0002 and 0.001 square inches.

23. The container recited in claim 20, wherein said cap has a flange, and said vent channels extend longitudinally along said outside surface of said cap body to said flange and continue extending radially along a first surface of said flange.

24. The container recited in claim 23, wherein said first surface of said flange is oriented at an acute angle with respect to said outside surface of said cap body.

25. The container recited in claim 23, wherein said flange has a cylindrical wall between said first surface of said flange and a second surface of said flange, and said vent channels continue extending from said first surface of said flange longitudinally along said cylindrical wall.

* * * * *